United States Patent
Yakowenko et al.

(10) Patent No.: US 7,587,409 B2
(45) Date of Patent: Sep. 8, 2009

(54) COMPUTER-IMPLEMENTED SYSTEM AND METHOD FOR HANDLING NODE-LINK REPRESENTATIONS

(75) Inventors: Jyoti Yakowenko, Raleigh, NC (US); Sanjay N. Matange, Cary, NC (US)

(73) Assignee: SAS Institute Inc., Cary, NC (US)

( * ) Notice: Subject to any disclaimer, the term of this patent is extended or adjusted under 35 U.S.C. 154(b) by 209 days.

(21) Appl. No.: 10/949,166

(22) Filed: Sep. 24, 2004

(65) Prior Publication Data

US 2006/0074926 A1    Apr. 6, 2006

(51) Int. Cl.
*G06F 7/00* (2006.01)
*G06F 17/00* (2006.01)
*G06F 3/00* (2006.01)

(52) U.S. Cl. ...................................... 707/102; 715/713
(58) Field of Classification Search ........................ None
See application file for complete search history.

(56) References Cited

U.S. PATENT DOCUMENTS

| | | | |
|---|---|---|---|
| 5,295,243 A * | 3/1994 | Robertson et al. | ........... 715/848 |
| 5,333,254 A | 7/1994 | Robertson | |
| 5,546,529 A | 8/1996 | Bowers et al. | |
| 5,555,354 A | 9/1996 | Strasnick et al. | |
| 5,565,888 A | 10/1996 | Selker | |
| 5,590,250 A | 12/1996 | Lamping et al. | |
| 5,619,632 A | 4/1997 | Lamping et al. | |
| 5,786,820 A | 7/1998 | Robertson | |
| 5,812,134 A * | 9/1998 | Pooser et al. | ................ 715/848 |
| 6,057,843 A | 5/2000 | Van Overveld et al. | |
| 6,204,850 B1 | 3/2001 | Green | |
| 6,259,451 B1 | 7/2001 | Tesler | |

(Continued)

OTHER PUBLICATIONS

John Lamping et al., "A Focus+Context Technique Based on Hyperbolic Geometry for Visualizing Large Hierarchies", 1995, Xerox Palo Alto Research Center, pp. 401-408.

(Continued)

*Primary Examiner*—Charles Rones
*Assistant Examiner*—Harold A Hotelling
(74) *Attorney, Agent, or Firm*—Jones Day

(57) ABSTRACT

Computer-implemented methods and systems for displaying nodes on a display device, wherein the nodes have a hierarchical context. Positional information associated with a plurality of nodes is used to generate a display for the nodes in response to a change in focal position. The generated node display maintains hierarchical contextual information about the nodes.

33 Claims, 15 Drawing Sheets

U.S. PATENT DOCUMENTS

| | | |
|---|---|---|
| 6,281,899 B1 | 8/2001 | Gould et al. |
| 6,297,824 B1 * | 10/2001 | Hearst et al. ............. 715/848 |
| 6,300,957 B1 | 10/2001 | Rao et al. |
| 6,304,260 B1 | 10/2001 | Wills |
| 6,326,988 B1 | 12/2001 | Gould et al. |
| 6,377,259 B1 | 4/2002 | Tenev et al. |
| 6,449,744 B1 | 9/2002 | Hansen |
| 6,628,304 B2 | 9/2003 | Mitchell et al. |
| 6,628,312 B1 | 9/2003 | Rao et al. |
| 6,646,652 B2 * | 11/2003 | Card et al. ............. 345/645 |
| 6,654,761 B2 | 11/2003 | Tenev et al. |
| 6,693,633 B2 * | 2/2004 | Loomis et al. ............. 345/427 |
| 2002/0163517 A1 * | 11/2002 | Loomis et al. ............. 345/440 |
| 2003/0007002 A1 * | 1/2003 | Hida et al. ............. 345/734 |
| 2005/0273730 A1 | 12/2005 | Card et al. |
| 2006/0074926 A1 | 4/2006 | Yakowenko et al. |
| 2006/0156228 A1 | 7/2006 | Gallo et al. |

OTHER PUBLICATIONS

Tamara Munzner, "Visualizing the Structure of the World Wide Web in 3D Hyperbolic Space", Proceedings of VRML '95, special issue of Computer Graphics, ACM SIGGRAPH, New York, 1995, pp. 33-38.

* cited by examiner

US 7,587,409 B2

COMPUTER-IMPLEMENTED SYSTEM AND METHOD FOR HANDLING NODE-LINK REPRESENTATIONS

TECHNICAL FIELD

This document relates generally to user interfaces and more particularly to computer-implemented generation of node-link representations for display on user interfaces.

BACKGROUND

Historically, hierarchical data has been represented in a structured layout that helps in the understanding of parent-child relationships in the data. One approach has been to display the data in a top-down manner wherein children nodes are shown connected to their parent node with positions below the parent node. Another approach includes displaying the data in a left-right manner wherein children nodes are shown connected to their parent node with positions to the right of a parent node.

These approaches encounter multiple difficulties when the display is altered, such as when a user changes the focus of a node display. Several approaches encounter difficulty in illustrating parent-child relationship even from the initial display of the nodes. Such approaches remove the hierarchical relationship hints present in a structured hierarchical arrangement, thus making the layout more difficult to comprehend.

As an example, FIG. 1A provides a display 30 wherein a plurality of nodes is shown after a user has changed the focus of the display 30. Before the user changed the focus, the "Robert Hornsby" node 32 was the parent of the "Susie Smith" node 34, but as shown in FIG. 1A, that parent-child relationship information was removed when the user shifted focus. As another example, FIG. 1B provides a display 40 wherein a plurality of nodes is shown after a user has changed the focus of the display (to that of the dot 42). Originally, the "Harry Hines" node 48 was the parent of the "Alycia Allen" node 50. However, as shown in FIG. 1B, such parent-child relationship information was not visually retained when the user shifted focus. These illustrate but a few of the difficulties.

SUMMARY

In accordance with the teachings provided herein, computer-implemented systems and methods are provided. As an example, a method and system include displaying nodes on a display device, wherein the nodes have a hierarchical context. Positional information associated with a plurality of nodes is used to generate a display for the nodes in response to a change in focal position. The generated node display maintains hierarchical contextual information associated with the nodes. As another example of a system and method, a conal transformation can be performed upon the nodes when generating the display.

DETAILED DESCRIPTION

Figure 1A:
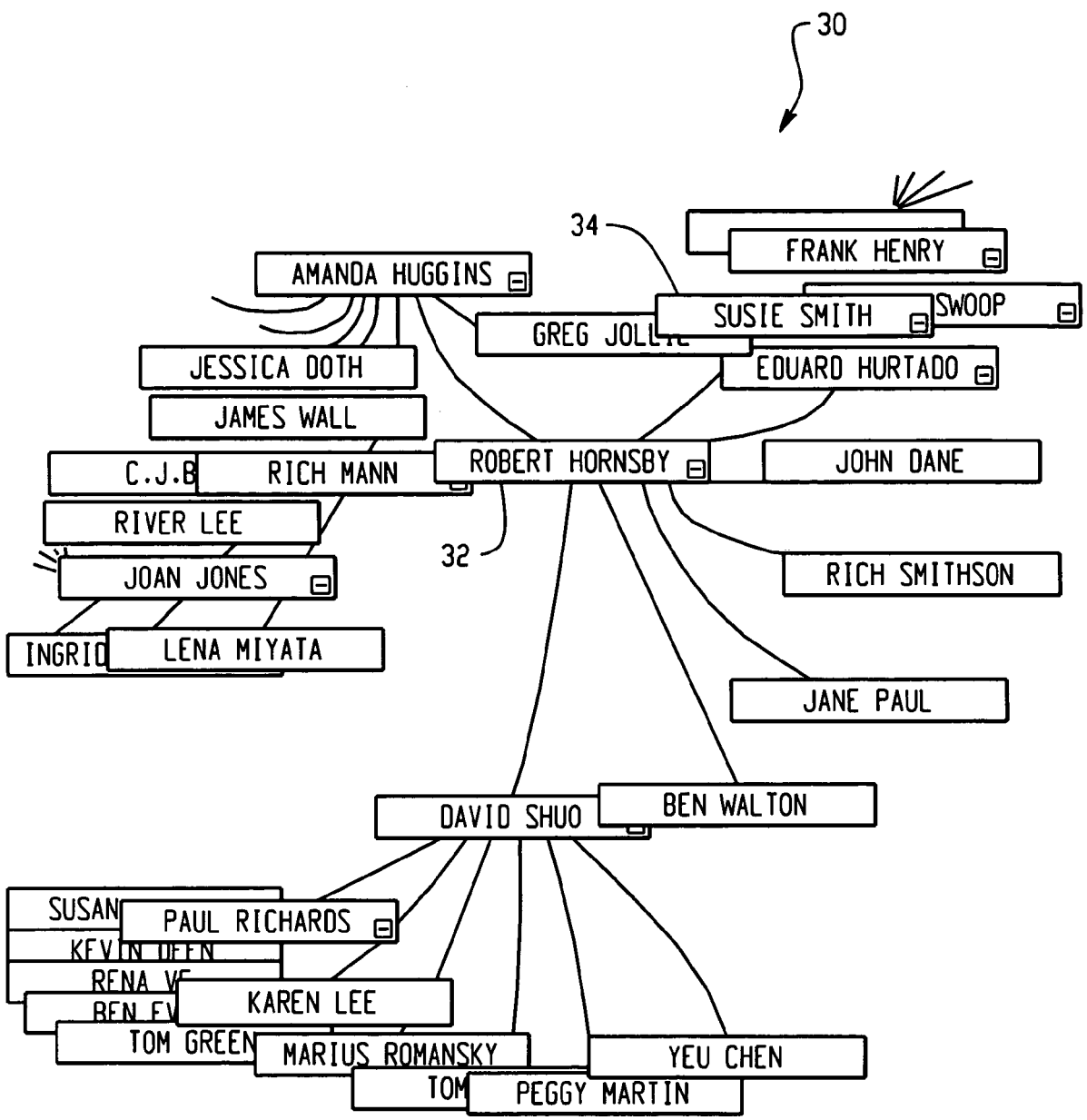
FIGS. 1A and 1B are displays of nodes generated using prior art approaches.
Figure 1B:
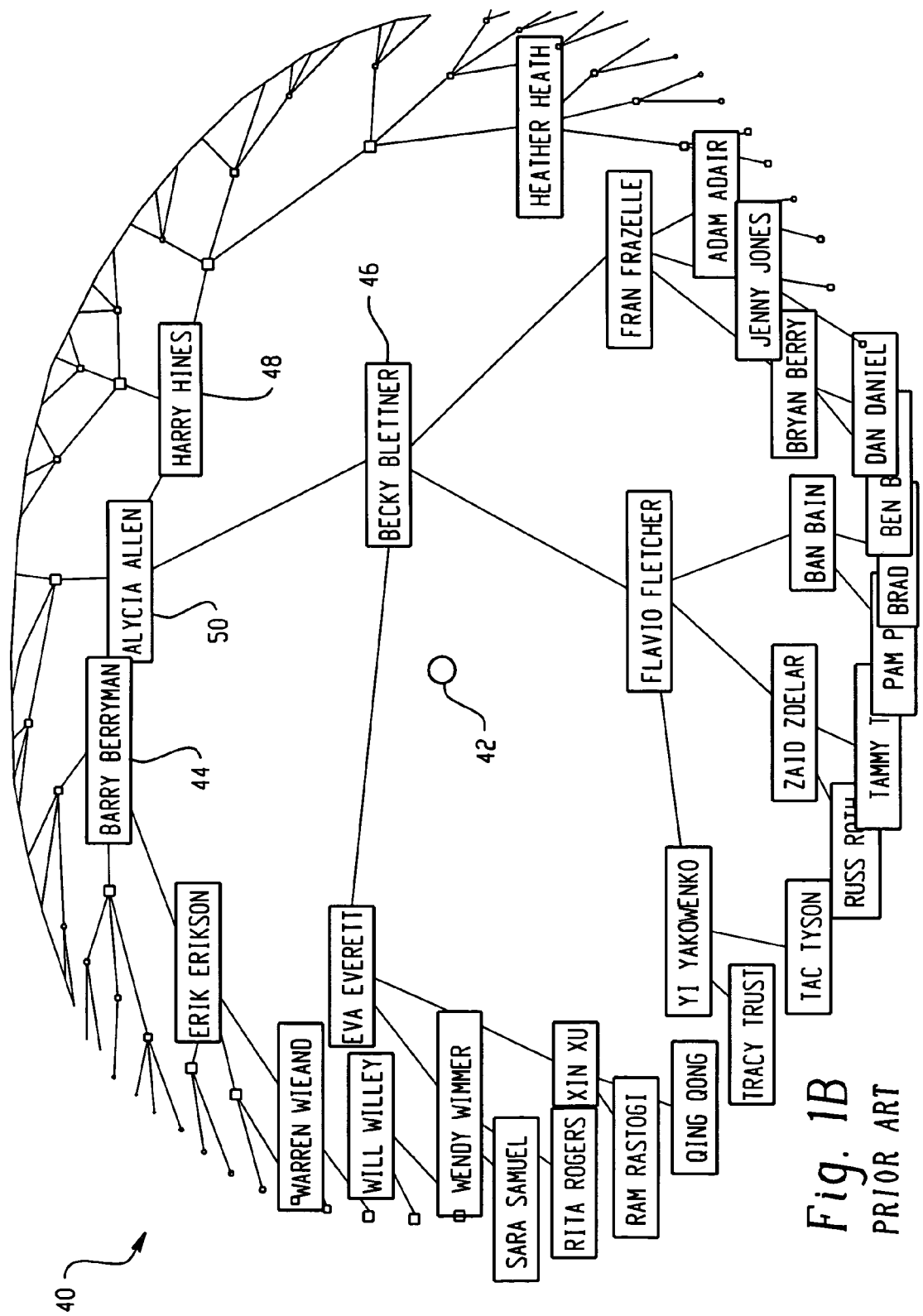
Figure 2:
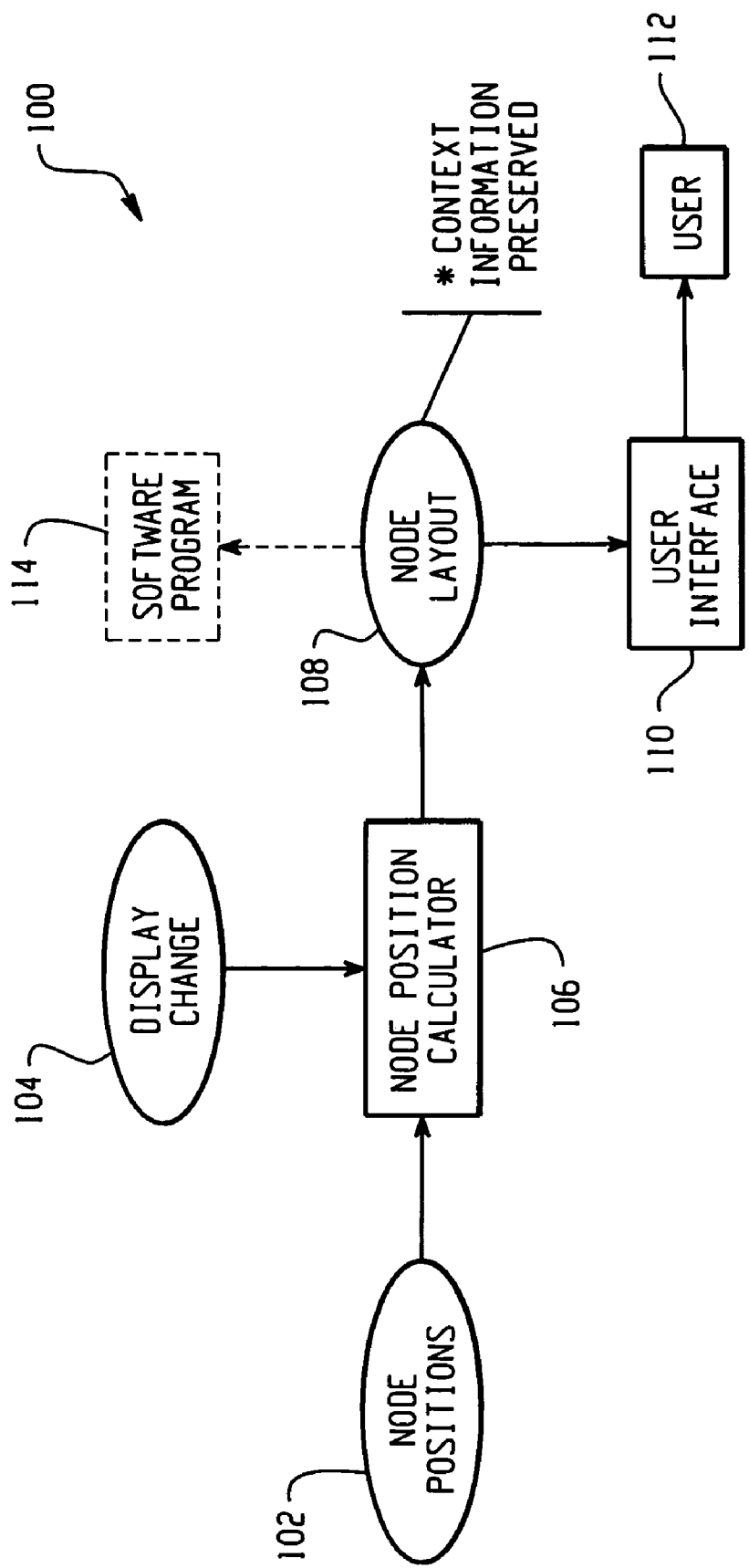
FIG. 2 is a block diagram depicting a system to generate node displays.

FIG. 2 depicts a computer-implemented system 100 that allows a change in a display of nodes to occur, while preserving the contextual information associated with the nodes. The contextual information can include such aspects as the relationship between the area of interest and the rest of the diagram as well as node parent-child relationships. The display change may have occurred manually by the user or automatically by a software program.

When a display change is to occur, such as by changing the display's focus or viewing a portion of the display in greater/lesser detail, node positional data 102 as well as information 104 about the display change are provided to a node positional calculator software 106. The node position calculator 106 determines new positions 108 for the nodes that maintain all or substantially most of the nodes' contextual information. All or some of the nodes (as the case may be) are displayed at their new positions 108 on a user interface 110 for a user 112, or the nodes' new positional information 108 can be provided to another software program 114 for processing by that software program 114.

Figure 3:
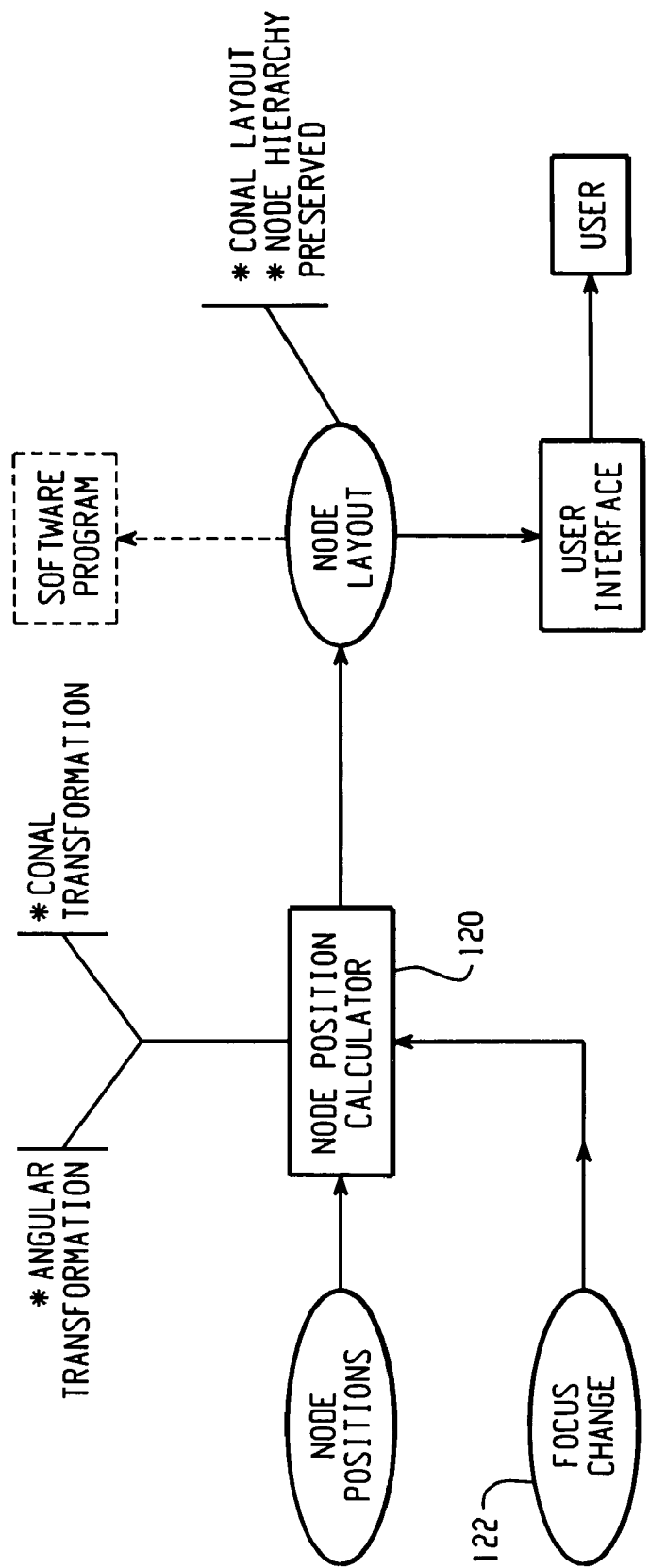
FIG. 3 is a block diagram depicting a system to generate node displays using angular and conal transformations.

As an illustration, FIG. 3 depicts an example of a system that displays data in a conal layout and then maintains the conal geometry while magnifying the area around the focus. In this example, a node position calculator 120 includes such functionality that can perform angular transformations and conal transformations after a change 122 in focus has occurred. An angular transformation pushes away the nodes on the arch from direction of interest towards the edges of the cone. A conal transform is performed after the angular transform, and it can be a modified regular fisheye (e.g., a radial fisheye). The lens strength can be varied with the minimum value at the apex of the cone to the maximum along the base of the cone. Because of the varying strength, the lower level does not go above the parent node in the cone.

Figure 4:
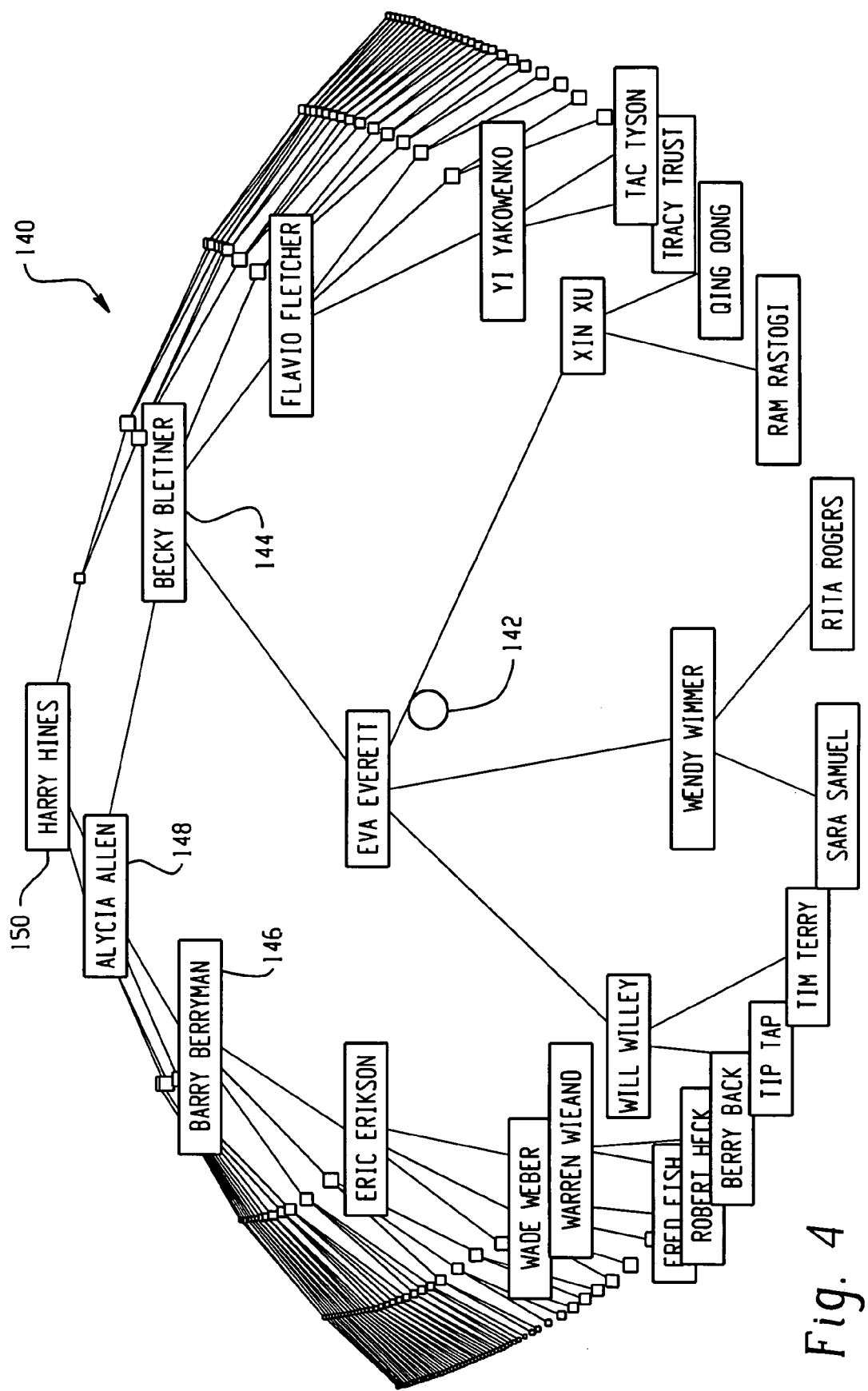
FIGS. 4-7 are screen displays depicting node displays.

FIG. 4 depicts at 140 a display resulting from use of a system configured as shown in FIG. 3. With reference to FIG. 4, a plurality of nodes is shown after a user has changed the focus of the display (to that of the dot 142). Although the user has changed the focus, the display has maintained context information, such as parent-child relationships. For example, it is clear that the "Becky Blettner" and "Barry Berryman" nodes (144, 146) are the children of the "Alicia Allen" node 148 (which is the child of the "Harry Hines" node 150) because these nodes (144, 146) appear below node 148.

Figure 5:
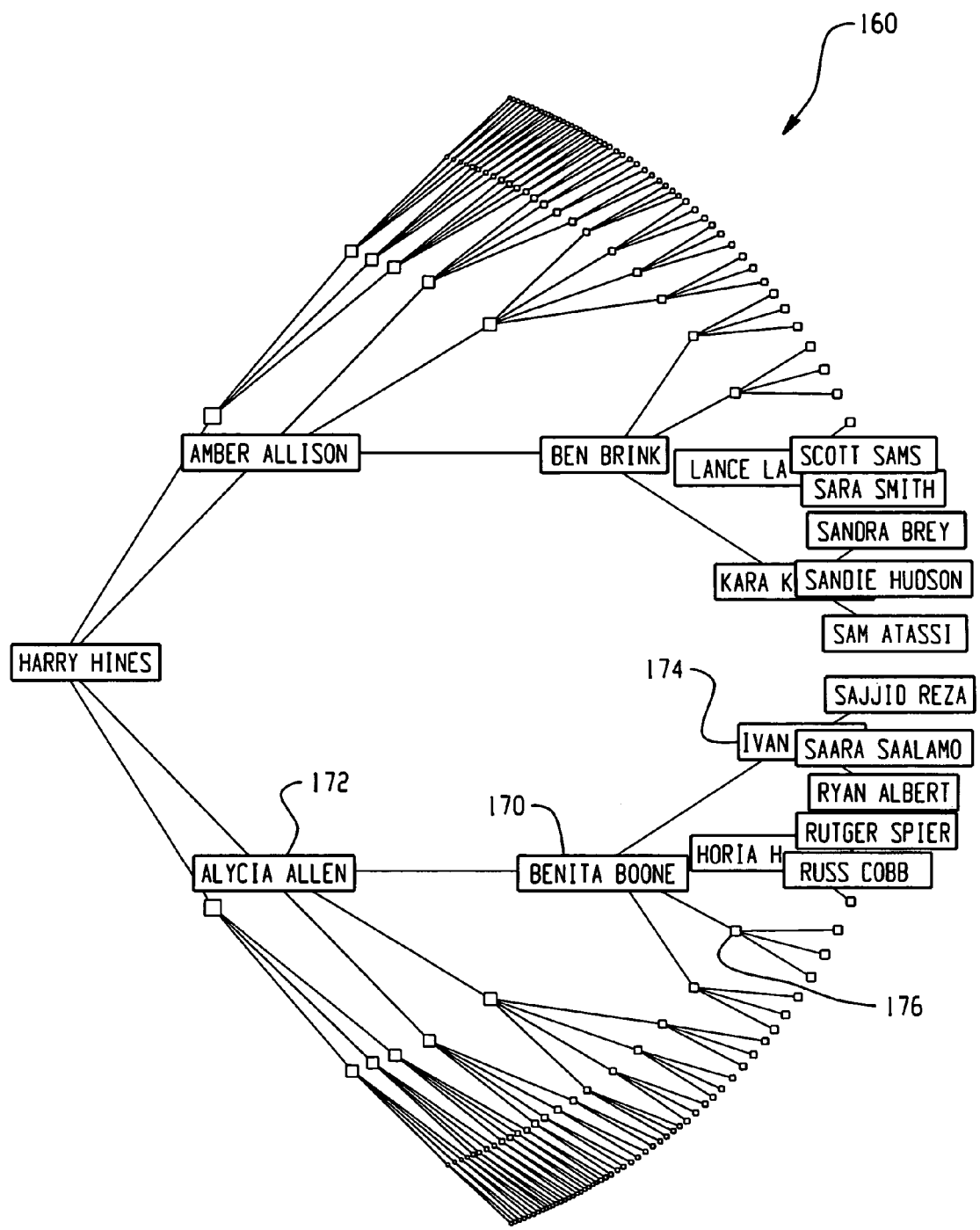

It should be understood that node displays may be depicted in many different ways. For example, FIG. 5 shows application of a system configured as shown in FIG. 3, but displays nodes in a left-right format 160. FIG. 5 is also in this example displayed in a conal manner (e.g., nodes are displayed along a horizontally aligned cone such that children nodes are always on the left side on the parent nodes). To see the "Benita Boone" node 170 in greater detail (which node 170 is a child of the "Alycia Allen" node 172 and is the parent of the "Ivan Ivey" node 174 and the "Hope Hoffler" node 176), the user changes the display's focus.

Figure 6:
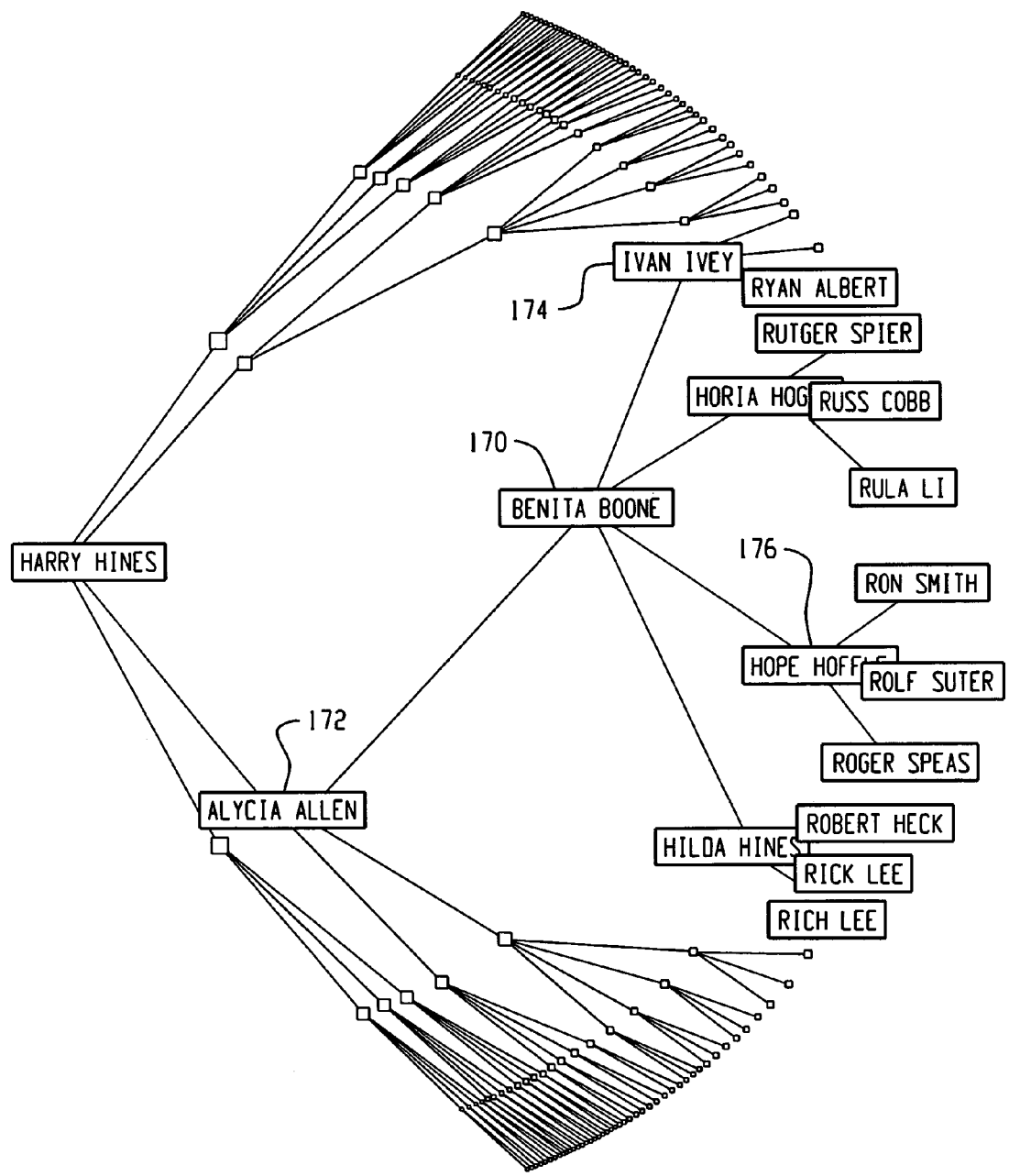
Figure 7:
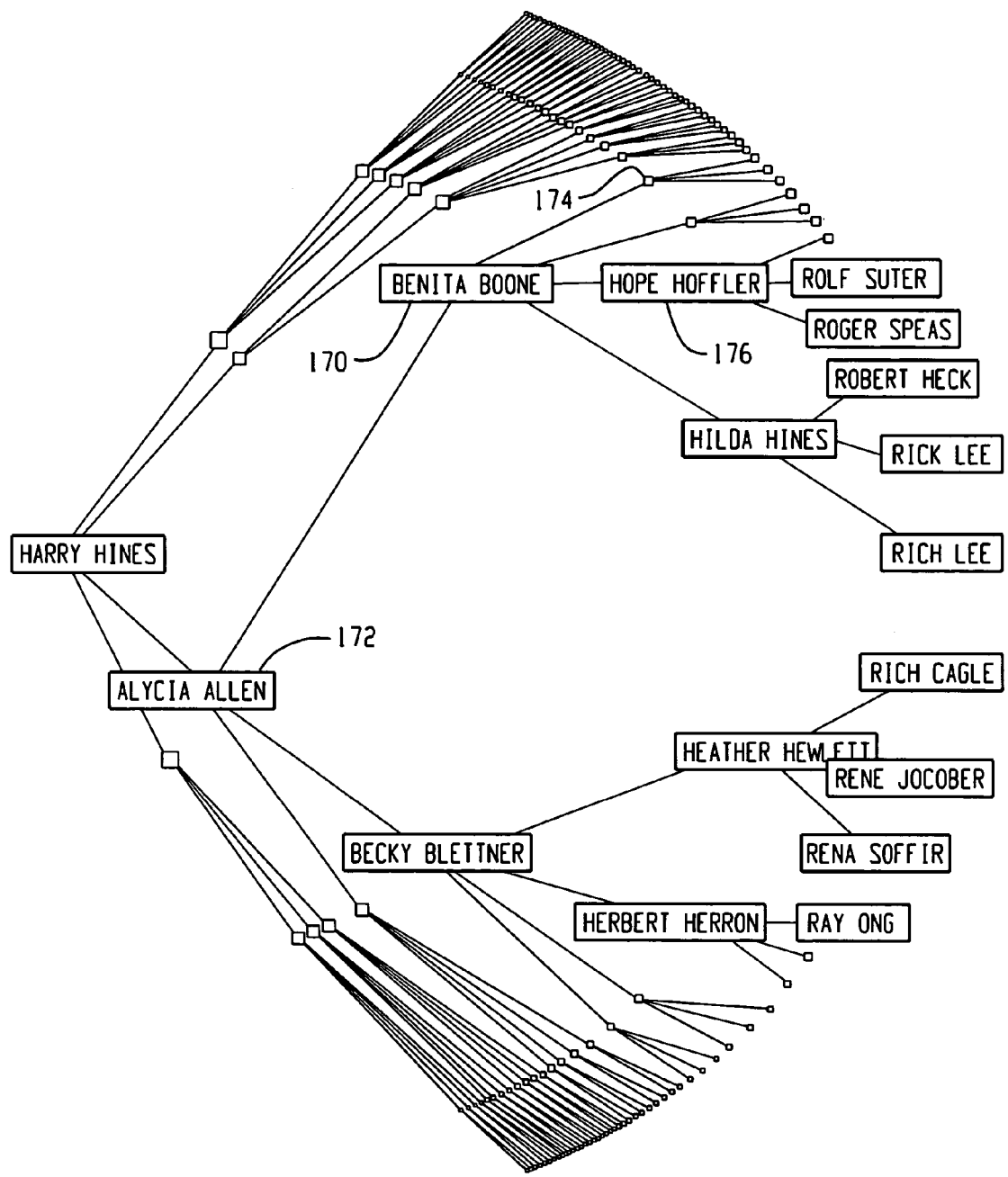

FIG. 6 displays the nodes in a conal manner after the user has changed the focus. The display maintains the context information despite the change in focus. This is illustrated by the "Benita Boone" node 170 still being shown as a child of the "Alycia Allen" node 172 and as the parent of the "Ivan Ivey" node 174 and the "Hope Hoffler" node 176. A further change in focus as shown in FIG. 7 still results in a display that maintains the context information for the "Benita Boone" node 170.

Figure 8:
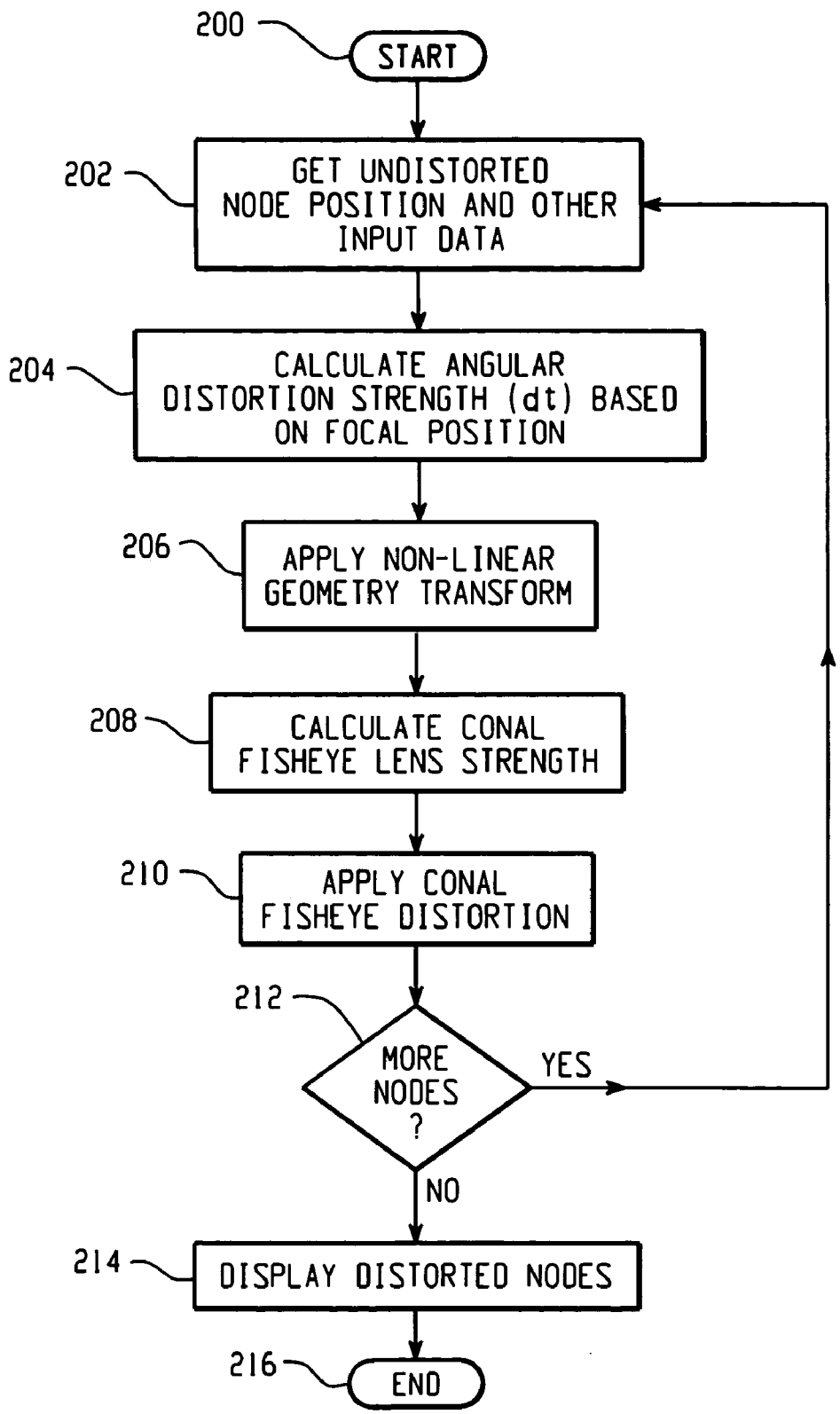
FIG. 8 is a flowchart depicting an example of an operational scenario for generating node displays.

FIG. 8 depicts an example of an operational scenario for displaying nodes. With reference to FIG. 8, start block 200 indicates that at step 202 the undistorted position for a node on a tree and other information (e.g., the current focal position on the display device and the current "center" position of a radial tree) are obtained. The undistorted node position may be expressed in terms of x-y coordinates on the display device. It should be understood that the display device includes any computer visual communication device, such as a computer terminal, a lap-top screen, a PDA (personal digital assistant) screen, or other such devices. The focal position is typically a location on the screen as may be specified by a user through a computer mouse or other interface device. The focal position may also have been determined by a computer software program that automatically locates areas or positions of interest on a node tree for the user. It is noted that the focal position may not always at the center of the screen.

After the input data are obtained at step 202, step 204 determines what angular transformation is to be performed. This can be done by calculating an angular distortion strength (dt) based on focal position. The angular distortion strength factor determines how much angular transformation is to be used.

A system can be configured so as to allow a user designate the degree of angular transformation. For example, if a user wants to perform less angular transformation, then the user specifies a lower value. If the user wants to perform a greater amount of angular transformation, then the user specifies a higher value. The angular distortion strength factor can also be based upon the focal position relative to the center of the display screen. The further away the focal position is from the center of the display screen, the greater is the angular distortion strength factor. For example, if a user wishes to have maximum angular distortion, the user may specify a distortion factor ("fac") which is the maximum value within a distortion range of one to ten. The x and y values in this example for the focus position are: fx=0.5 and fy=0.0 relative to the center of the display screen. The angular distortion strength factor ("dt") is determined as:

$dt = fac*sqrt(fx*fx + fy*fy)$ $dt = 10*sqrt(0.5*0.5 + 0*0)$ $dt = 10*0.5$ $dt = 5$ This determined value may be used in the enhancing angular transformation to effect how much angular displacement is performed upon the nodes. It should be understood that an angular distortion strength factor may be determined in many different ways so as to suit the application at hand. As an illustration, a default value for the angular distortion strength factor can be used so that the user does not have to specify a value.

Figure 9:
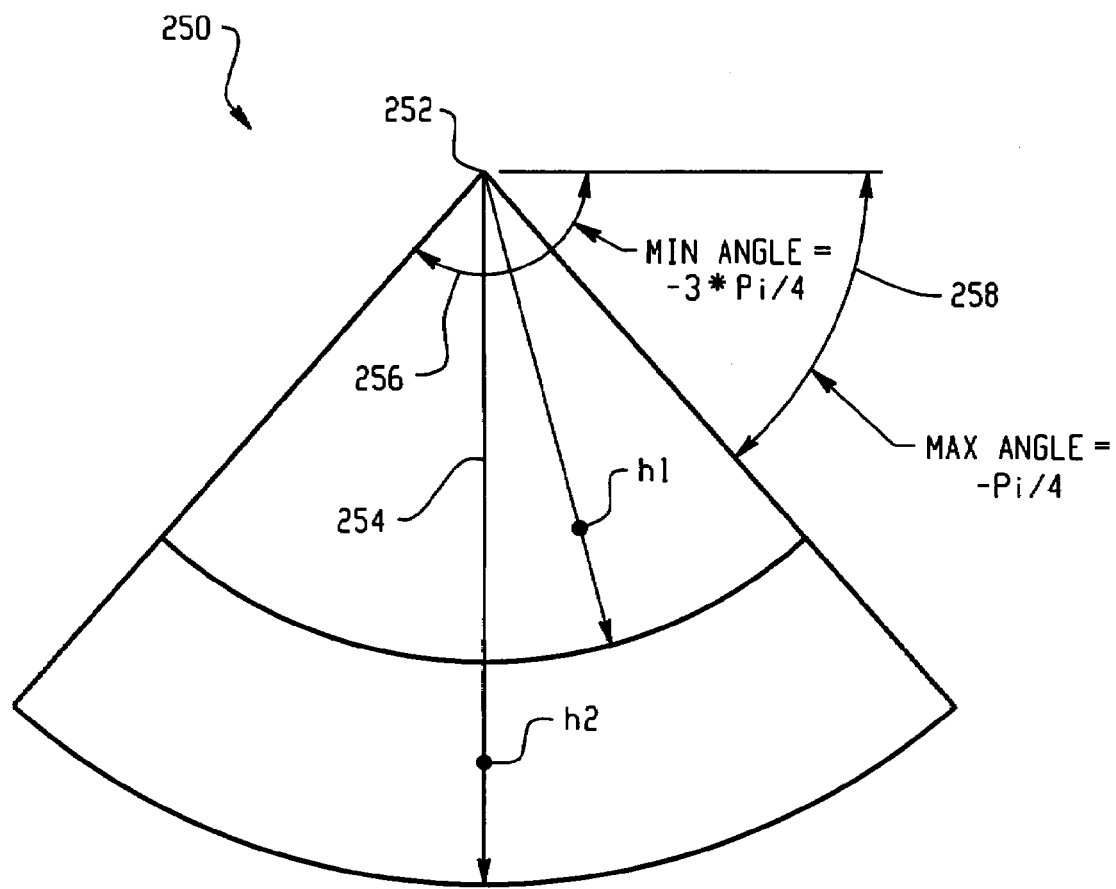
FIG. 9 provides an illustration of certain variables used in the calculations of FIGS. 10 and 11.

Step 206 applies a non-linear geometry transformation that preserves the angular transformation (e.g., preserving the distance from the node to the root—the nodes are shifted towards the edges of the cone along the concentric arcs). Step 208 calculates conal fisheye lens strength based on the distance from the apex of the cone along its center axis (note: the cone's apex and center axis are illustrated in FIG. 9 below). Step 210 applies a conal fisheye distortion to the node in this operational scenario that causes reduction of the density at the focal point by moving the nodes away from the focal point towards the cone edges.

Decision step 212 examines whether any more nodes of the tree remain to be processed. If there are, then processing continues at step 202 so that the next node may be obtained. If no more nodes remain to be processed, then the distorted nodes are displayed at step 214 before processing for this operational scenario terminates at end block 216.

It should be understood that many different variations can be utilized in this operational scenario, such as different types of transformations other than cone restricted angular and radial transforms such as using different mathematical functions for the transformations to control the shape of the distortions, provided that the context is preserved. Still further, a combination of parameters can be provided to decide which nodes are displayed with full level of detail. These parameters may be selected to display full level of detail for the complete path from the root node of the node tree to the node of interest. As another example, the level of detail for each node can be determined based on how far it is from the focus point and a direction of interest. These parameters can be chosen such that all the nodes on the path from the node near the focus point to the root are displayed with full level of detail.

FIG. 9 provides a graphical illustration of certain conal geometric characteristics mentioned above and used in the calculations of FIGS. 10 and 11. FIG. 9 shows a conal layout at 250 wherein the cone has an apex 252 and a center axis 254. Different angles can be used in the calculations, for example "Minimum" and "Maximum" angles of the conal layout 250. The Minimum Angle variable is shown at 256 and has a value of -3*Pi/4. The Maximum Angle variable is shown at 258, and has a value of -Pi/4. The difference "MaxAngle-MinAngle" can be termed the angle of the cone, and (MaxAngle+MinAngle)/2 describes the orientation of the cone. The range for the angles is -Pi to +Pi with the constraint that MaxAngle>MinAngle. It is noted that the lens and the focus point may not be located at the center of the screen. Accordingly, (fx, fy) is the location of the focus point, and the focusTheta defines the direction from focus node to the root node (i.e., the node at the apex of the hierarchy or cone). Variables h1 and h2 represent the height of the respective arches which are used to compute the conal lens strength. MaxHeight is the height of the screen.

Figure 10:
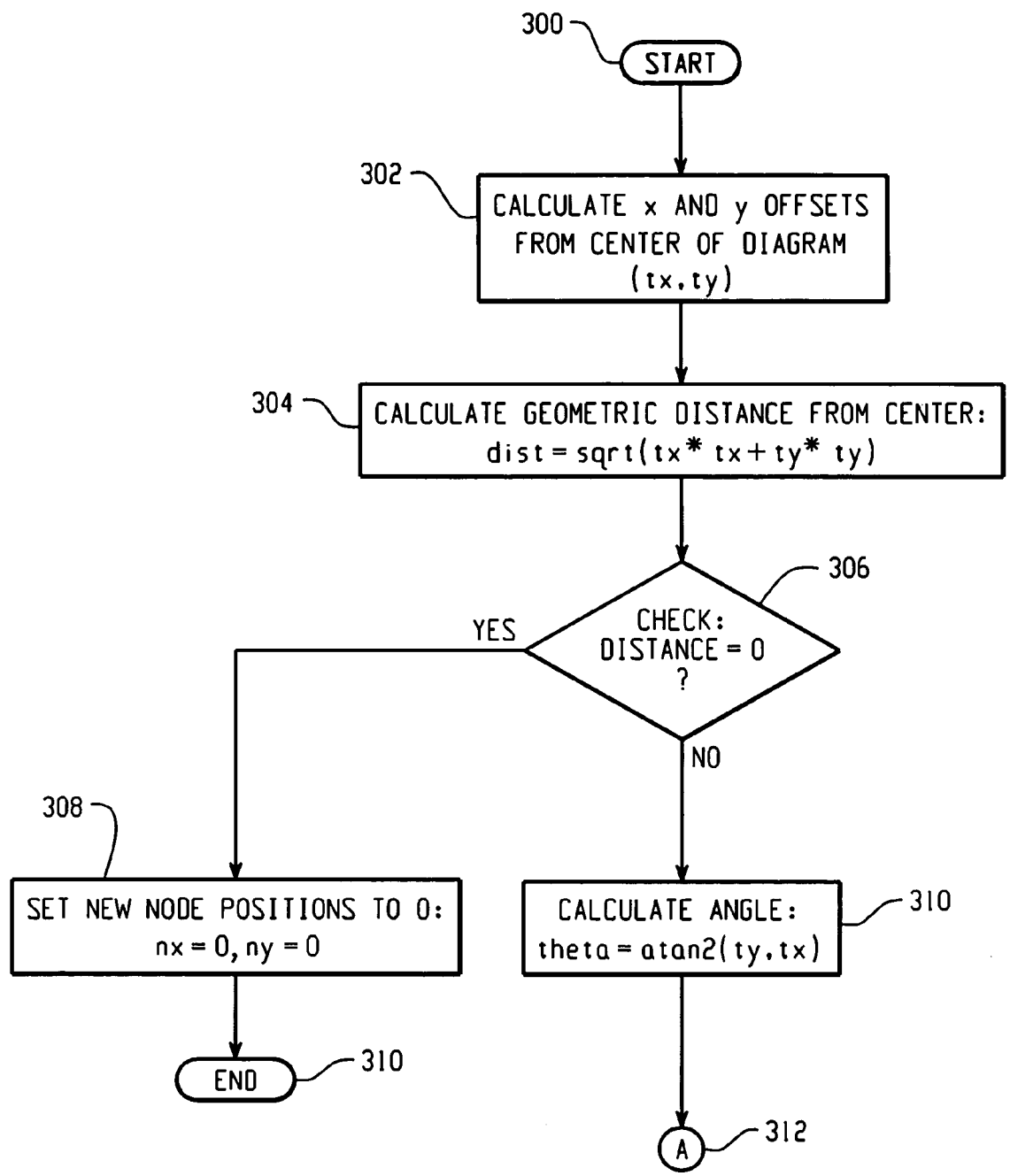
FIGS. 10 and 11 are flowcharts depicting an example of an operational scenario for determining angular transformations.
Figure 11:
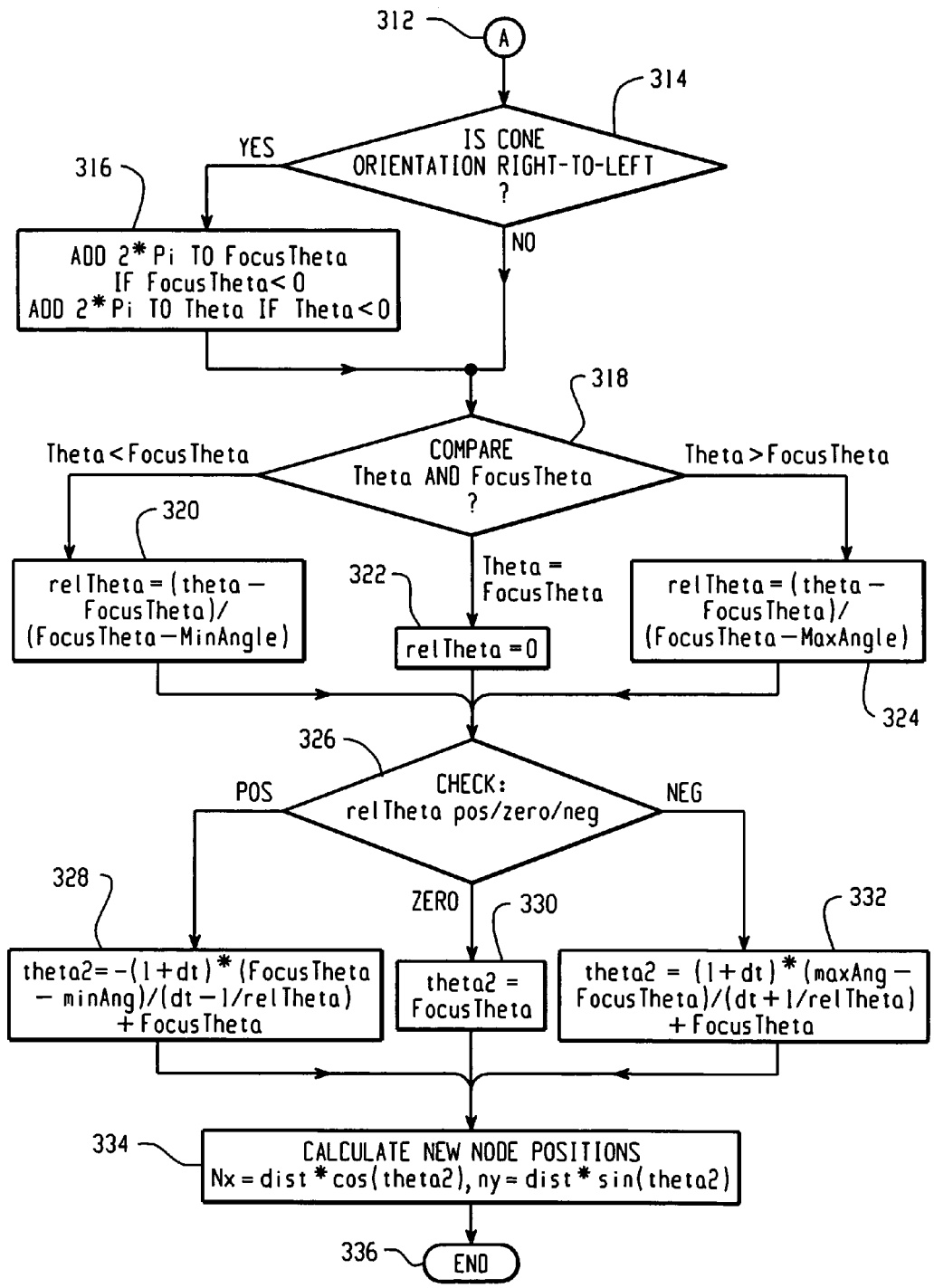

FIGS. 10 and 11 are flowcharts showing steps used in one possible operational scenario to determine an angular transformation of nodes. Start block 300 indicates that at step 302, the distance that the input node is offset from the center of the screen is calculated using the x and y coordinates of the input node. It should be understood that while this example is using x and y coordinate notation, the systems and methods disclosed herein are not limited to only Cartesian coordinate systems, but may use any coordinate system, such as polar coordinates and other approaches. The calculated distances are stored in the variables tx and ty.

Step 304 calculates the geometric distance from the center. The center is typically the center position of the display region of the screen, but may also include the center of the radial tree or another location as may be determined by the user or automatically by a computer software program. The node's geometric distance from the center is determined using the function:

$$distance=\text{sqrt}(tx*tx+ty*ty)$$

Decision step 306 examines whether the calculated distance is zero. If the distance is zero, then step 308 sets the new node positions to zero:

$$nx=0, ny=0$$

End block 310 returns the processing to the main flowchart (of FIG. 8) if no more nodes need processing. However, if the distance does not equal zero as determined by decision step 306, then control passes to step 310 which calculates a polar phase, theta for the node using an arc tangent function as follows:

$$theta=a\tan 2(ty,tx)$$

Processing continues on FIG. 11 as indicated by continuation block 312. With reference to FIG. 11, decision step 314 examines the orientation of the cone. For example, if the orientation of the cone is right-to-left, then processing continues at step 316 wherein if FocusTheta is less than zero, then 2*Pi is added to FocusTheta. If Theta is less than zero, then 2*Pi is added to the value of Theta. Processing continues at decision step 318 after step 316 is performed or if decision step 314 determines that the cone orientation is not right-to-left.

At decision step 318, the values of Theta and FocusTheta are compared. If Theta is less than FocusTheta, then the following calculation is performed at step 320:

$$relTheta=(theta-FocusTheta)/(FocusTheta-MinAngle)$$

If Theta is equal to FocusTheta, then relTheta is set to zero at step 322. If Theta is greater than FocusTheta, then the following calculation is performed at step 324:

$$relTheta=(theta-FocusTheta)/(FocusTheta-MaxAngle)$$

Processing continues at decision step 326 wherein the value of relTheta is checked. If the value is positive, then the following calculation is performed at step 328:

$$theta2=-(1+dt)*(FocusTheta-minAng)/(dt-1/relTheta)+FocusTheta$$

If the value of relTheta is zero, then the following calculation is performed at step 330:

$$theta2=FocusTheta$$

If the value of relTheta negative, then the following calculation is performed at step 332:

$$theta2=(1+dt)*(maxAng-FocusTheta)/(dt+1/relTheta)+FocusTheta$$

Step 334 calculates a new node position as follows:

$$nx=distance*\cos(theta2), ny=distance*\sin(theta2)$$

Processing of the node terminates at end block 336. Additional nodes are processed in a similar manner.

Figure 12:
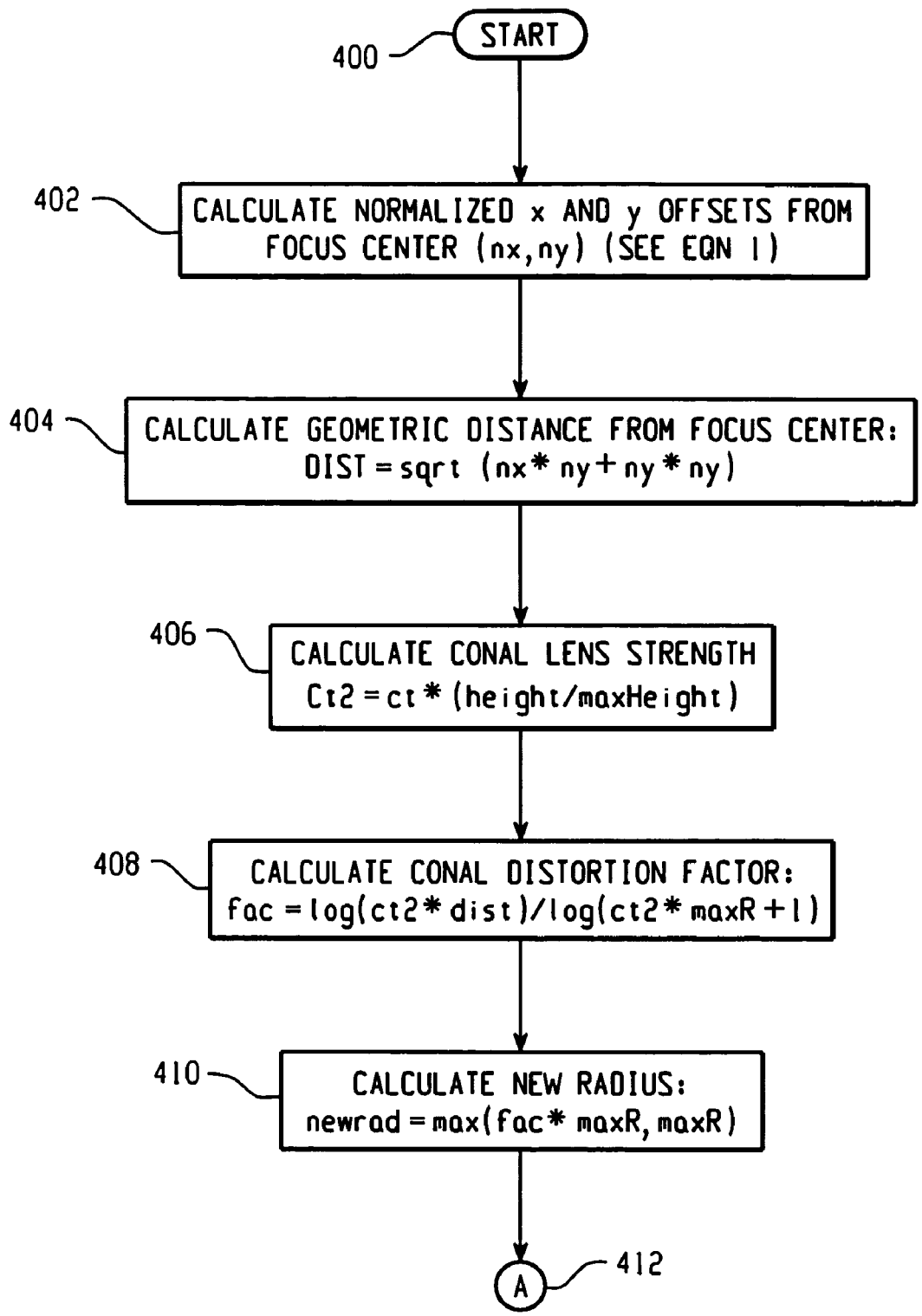
FIGS. 12 and 13 are flowcharts depicting an example of an operational scenario for determining conal transformations.
Figure 13:
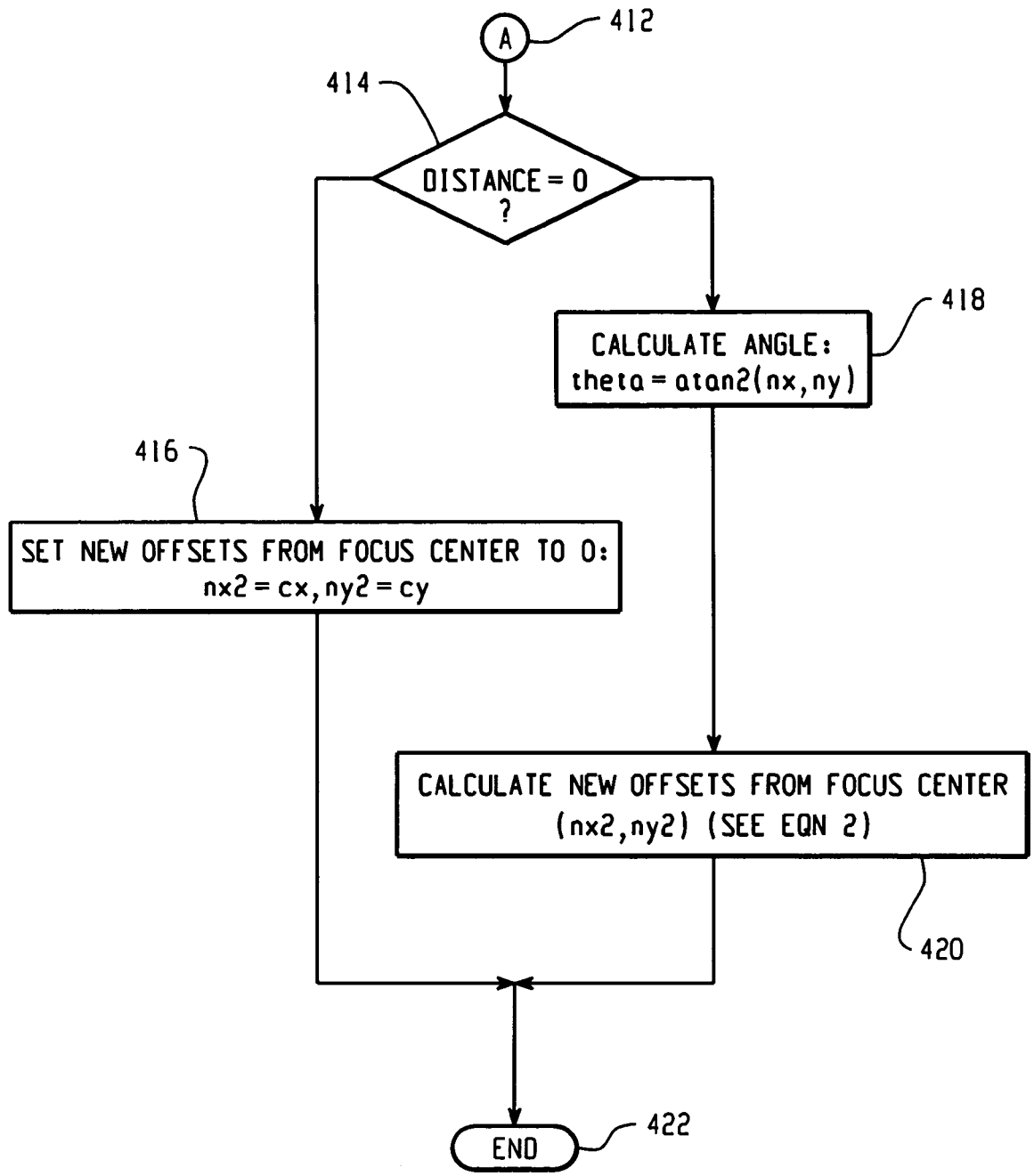

FIGS. 12 and 13 depict an operational scenario for applying a conal transformation. Start block 400 indicates that step 402 calculates normalized x and y offsets from a focus center (nx, ny) as follows:

Is (x>fx) ?

If yes: $nx=(x-fx)*(screenWidth/(2*fx))$

If no: $nx=(x-fx)*(screenWidth/(2*(screenWidth-fx))$

Is (y>fy) ?

If yes: $ny=(y-fy)*(screenHeight/(2*fy))$

If no: $ny=(y-fy)*(screenHeight/(2*(screenHeight-fy))$

Step 404 calculates the geometric distance of a node from the focus center using the function:

$$distance=\text{sqrt}(nx*nx+ny*ny)$$

Step 406 calculates conal lens strength as follows:

$$Ct2=ct*(height/maxHeight).$$

Step 408 calculates a conal distortion value as follows:

$$fac=\log(ct2*dist)/\log(ct2*maxR+1)$$

Step 410 calculates a new radius as follows:

$$newrad=\max(fac*maxR, maxR)$$

With reference to FIG. 13, decision step 414 examines whether the distance as calculated in step 404 is zero. If the distance is zero, then the new offsets from the focus center are set by step 416 to zero (nx2=cx, ny2=cy) and the program ends at end block 422.

If the distance does not equal zero as determined by decision step 414, then step 418 calculates the angle theta as follows using the arctangent function:

$$theta=a\tan 2(ny,nx)$$

Step 420 calculates the new offsets from the focus center (nx2, ny2) as follows wherein aspect is the aspect ratio, ScreenHeight/ScreenWidth:

Is (cos(theta)>0) ?

If yes: $nx2=newrad*\cos(theta)*(screenWidth-fx)*2/screenWidth$

If no: $nx2=newrad*\cos(theta)*fx*2/screenWidth$

Is (sin(theta)>0) ?

If yes: $ny2=aspect*newrad*\sin(theta)*2*(screenHeight-fy)/screenHeight$

If no: $ny2=aspect*newrad*\sin(theta)*2*fy/screenHeight$

The program ends at end block 422. It should be understood that similar to the other processing flows described herein, one or more steps and the order of the steps in the flowcharts described herein may be altered, deleted, modified and/or augmented and still achieve the desired outcome.

Figure 14:
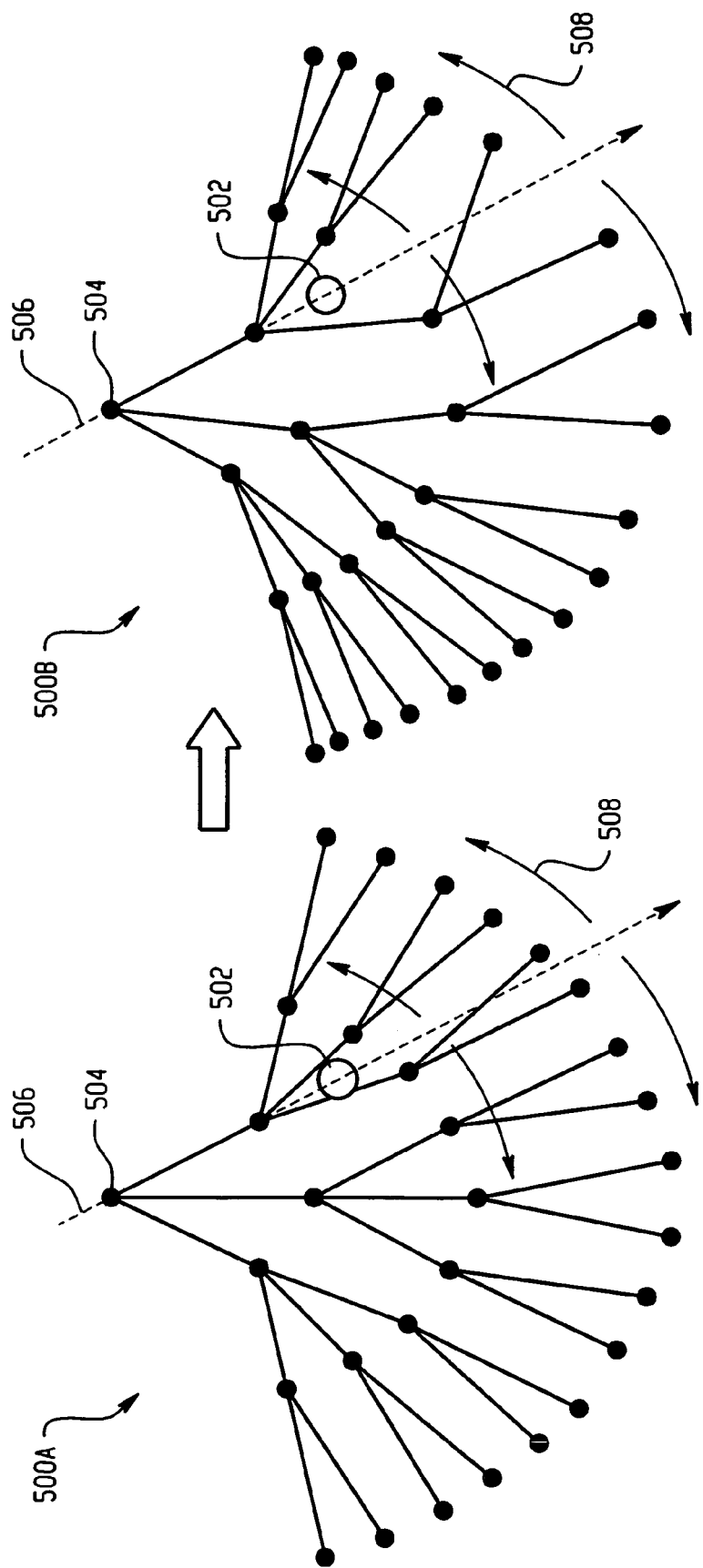
FIG. 14 depicts displays of nodes wherein focal position has been changed.

The calculations shown in this operational scenario allow a tree to maintain its cone geometry even after a focal point is moved. This is further illustrated in FIG. 14 which depicts the effect of a focal point change. With reference to FIG. 14, display 500A shows a node layout in a conal shape before the focus point 502 is moved. The result of moving the focus point 502 is shown in display 500B. Dashed arrows 506 in FIG. 14 represent a vector from the root node 504 to the current focus point 502. The other arrows (e.g., arrows 508) illustrate that, as a result of a focal point change, the nodes on a cone's arches or arcs are pushed away from a direction of interest (as shown by the vector 506) towards the edges of the cone. Because the nodes are moving along the arcs (or substantially along the arcs), the hierarchical information is maintained.

While examples have been used to disclose the invention, including the best mode, and also to enable any person skilled in the art to make and use the invention, the patentable scope of the invention is defined by claims, and may include other examples that occur to those skilled in the art. For example, the systems and methods can be used in the display of dense node-link diagrams that graphically represent hierarchical data. These include decision trees, organizational charts, OLAP (Online Analytical Processing) data viewers, etc. It is also noted that various fisheye distortion operations can be utilized with the systems and methods disclosed herein. For example, a non-linear expansion angular transformation as disclosed in U.S. Pat. No. 6,693,633 and issued to the assignee of this application can be used and is hereby incorporated herein by reference. A node position calculator can use such a non-linear expansion angular transformation in combination with a conal transformation. As disclosed in the patent, an angular transformation can include receiving first positions for use in locating a first node and a second node. The first node and second node are separated from each other and are at least substantially equidistant from a focal position. Second positions are determined for the first node and second node such that angular shift of the first node from its first position to its second position is different in magnitude than angular shift of the second node from its first position to its second position. These angular shifts for the first node and second node are with respect to the focal position. As another example disclosed in the patent, a non-linear angular transformation can include receiving first positions for locating a first node and a second node on the display device. The first node and second node are separated from each other and are at least substantially equidistant from a predetermined position on the display device. The second positions are determined for the first node and second node such that angular shift of the first node from its first position to its second position is different in magnitude than angular shift of the second node from its first position to its second position. The angular shifts for the first node and second node are determined based upon a focus position. The angular shifts for the first node and second node are with respect to the center position, and the first node and second node are displayed on the display device based upon the determined second positions for the first node and second node.

As another example of the wide scope of the systems and methods disclosed herein, the level of detail can be picked for each node based on the radial distortion factor and conal distortion factor. Also, the initial node layout step (e.g., step 202 on FIG. 8) can be done at a high level and the transforms can be applied as part of the rendering pipeline.

It is further noted that the systems and methods may be implemented on various types of computer architectures, such as for example on a single general purpose computer or workstation, or on a networked system, or in a client-server configuration, or in an application service provider configuration. In multiple computer systems, data signals may be conveyed via networks (e.g., local area network, wide area network, internet, etc.), fiber optic medium, carrier waves, wireless networks, etc. for communication among multiple computers or computing devices.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed as the invention:

1. A computer-implemented method for displaying nodes on a display device, wherein the nodes have a hierarchical context, said method comprising:

receiving positional information associated with a plurality of nodes;

using the positional information to generate a display for the nodes in response to a change in focal position;

wherein the using of the positional information includes performing an angular transformation upon the plurality of nodes' node positional information in order to angularly displace each of the plurality of nodes;

wherein a conal transformation is performed upon the angularly transformed node positional information in order to generate a three-dimensional conal layout of the nodes;

wherein generating the display for the nodes in response to a change in focal position includes displaying the generated conal layout of the nodes;

wherein the generated display includes displaying each of the plurality of nodes whose positional information was used in performing the angular transformation;

wherein the generated conal layout of the nodes maintains hierarchical contextual information about the nodes;

wherein the angular transformation and the conal transformation were performed upon the nodes when generating the display for the nodes in response to the change in focal position;

wherein said performing an angular transformation upon the plurality of nodes' node positional information comprises:

determining a focus theta angle that defines direction from a focus node to a root node;

determining nodal offsets with respect to center of the display;

determining geometric distances from the center;

for the geometric distances that are not zero, determining theta angles that are equal to a trigonometric transformation of the determined geometric distances;

comparing the determined theta angles with the determined focus theta angle in order to determine relative theta angles for the nodes;

wherein the relative theta angles are determined differently based upon whether: a theta angle for a node is less than the focus theta angle, a theta angle for a node is equal to the focus theta angle, or a theta angle for a node is greater than the focus theta angle;

if a determined relative theta angle has a positive value, then determining a second theta angle for a node based upon a first equation;

wherein the first equation determines a second theta angle for a node that is equal to:

−(1+dt)*(FocusTheta−minAng)/(dt+1/relTheta)+ FocusTheta;

wherein the dt for a node in the first equation is indicative of an angular distortion strength factor;
wherein the FocusTheta for a node in the first equation is indicative of the focus theta angle determined for the node;
wherein the relTheta for a node in the first equation is indicative of the relative theta angle determined for the node;
if a determined relative theta angle has a zero value, then determining a second theta angle for a node based upon a second equation;
wherein the second equation determines a second theta angle that is equal to a focus theta angle for a node;
if a determined relative theta angle has a negative value, then determining a second theta angle for a node based upon a third equation;
wherein the third equation determines for a node a second theta angle that is equal to:

(1+dt)*(maxAng−FocusTheta)/(dt+1/relTheta)+ FocusTheta;

wherein the dt for a node in the third equation is indicative of an angular distortion strength factor;
wherein the FocusTheta for a node in the third equation is indicative of the focus theta angle determined for the node;
wherein the relTheta for a node in the third equation is indicative of the relative theta angle determined for the node;
wherein the maxAng and the minAng for a node define angle of the conal layout;
wherein the three-dimensional conal layout of the nodes is generated using the determined second theta angles for the nodes.

2. The method of claim 1, wherein the hierarchical context conveys parent-child relationships in the display of the nodes.

3. The method of claim 1, wherein the change in focal position results in viewing at least several nodes in greater detail.

4. The method of claim 1, wherein the change in focal position is caused by a user.

5. The method of claim 1, wherein the focal position is a location on a display screen specified by a user through an interface device.

6. The method of claim 1, wherein the change in focal position is caused by a software program.

7. The method of claim 1, wherein the focal position indicates a location of interest as specified by a user.

8. The method of claim 1, wherein the focal position is located at center of the display.

9. The method of claim 1, wherein the focal position is not located at center of the display.

10. The method of claim 1, wherein the new node positions are provided to a software program.

11. The method of claim 1, wherein the generated display displays the nodes along arcs of concentric circles.

12. The method of claim 1, wherein a plurality of subsequently generated displays maintain the nodes in a three-dimensional conal layout.

13. The method of claim 12, wherein conal transformations were performed upon the nodes for use in maintaining the nodes in a three-dimensional conal layout in the plurality of subsequently generated displays.

14. The method of claim 12, wherein the conal transformations maintain the nodes in three-dimensional conal layouts while magnifying the area around the focal position and in a direction of interest.

15. The method of claim 1, wherein the nodes convey information.

16. The method of claim 1, wherein the angular transformation includes a non-linear angular expansion.

17. The method of claim 16, wherein the non-linear angular expansion includes receiving first positions for locating a first node and a second node on the display device,
wherein the first node and second node are separated from each other and are equidistant from a predetermined center position on the display device;
wherein second positions are determined for the first node and second node such that angular shift of the first node from its first position to its second position is different in magnitude than angular shift of the second node from its first position to its second position,
wherein the angular shifts for the first node and second node are determined based upon a focus position;
wherein the focus position indicates a position of interest on the display device;
wherein the angular shifts for the first node and second node are with respect to the center position; and
wherein the first node and second node are displayed on the display device based upon the determined second positions for the first node and second node.

18. The method of claim 1, further comprising:
calculating an angular distortion strength based on focal position;
using the calculated angular distortion strength when performing the angular transformation.

19. The method of claim 1, wherein the received positional information include nodes arranged in arch-shaped levels of a cone, further comprising:
calculating conal fisheye lens strength based on the distance from apex of the cone along its center axis;
using the calculated conal fisheye lens strength when performing the conal transformation.

20. The method of claim 1, wherein the conal transformation includes a conal fisheye distortion to the nodes wherein the conal transformation causes the reduction of the density of nodes along direction of the interest and increases density of nodes at edges of an arch.

21. The method of claim 20, wherein the angular transformation pushes away the nodes on an arch from direction of interest towards edges of the conal layout of the nodes.

22. The method of claim 21, wherein nodes in the conal layout appear in arch-shaped levels of the cone, wherein the pushing of the nodes on an arch allows the node's hierarchical context to be maintained.

23. The method of claim 22, wherein strength of conal transformation is varied with the minimum value at the apex of the cone to the maximum at the arch along the base of the cone.

24. The method of claim 1, wherein parameters are provided to determine which nodes are displayed with full level of detail.

25. The method of claim 1, wherein the generated node display is a dense node-link diagram that graphically represents hierarchical data.

26. The method of claim 1, wherein the generated node display is for use in a data mining software application.

27. The method of claim 1, wherein the generated node display is for use in a decision tree.

28. The method of claim 1, wherein the generated node display is for use in an organizational chart.

29. The method of claim 1, wherein the generated node display is for use in an OLAP (Online Analytical Processing) data viewer.

30. The method of claim 1, wherein the generated node display is for use in a decision tree, organizational chart, and OLAP (Online Analytical Processing) data viewer.

31. A computer-implemented apparatus for displaying nodes on a display device, wherein the nodes have a hierarchical context, said apparatus comprising:
   means for receiving positional information associated with a plurality of nodes;
   means for performing an angular transformation using the plurality of nodes' node positional information in order to angularly displace each of the plurality of nodes;
   means for performing a conal transformation using the angularly transformed node positional information in order to generate a three-dimensional conal node layout;
   wherein display of the generated conal node layout on the display device maintains hierarchical contextual information about the nodes;
   wherein the display includes displaying each of the plurality of nodes whose node positional information was used in performing the angular transformation;
   wherein said performing an angular transformation using the plurality of nodes' node positional information comprises:
      determining a focus theta angle that defines direction from a focus node to a root node;
      determining nodal offsets with respect to center of the display;
      determining geometric distances from the center;
      for the geometric distances that are not zero, determining theta angles that are equal to a trigonometric transformation of the determined geometric distances;
      comparing the determined theta angles with the determined focus theta angle in order to determine relative theta angles for the nodes;
         wherein the relative theta angles are determined differently based upon whether: a theta angle for a node is less than the focus theta angle, a theta angle for a node is equal to the focus theta angle, or a theta angle for a node is greater than the focus theta angle;
      if a determined relative theta angle has a positive value, then determining a second theta angle for a node based upon a first equation;
         wherein the first equation determines a second theta angle for a node that is equal to:

$$-(1+dt)*(\text{FocusTheta}-\text{minAng})/(dt-1/\text{relTheta})+\text{FocusTheta};$$

wherein the dt for a node in the first equation is indicative of an angular distortion strength factor;
            wherein the FocusTheta for a node in the first equation is indicative of the focus theta angle determined for the node;
            wherein the relTheta for a node in the first equation is indicative of the relative theta angle determined for the node;
      if a determined relative theta angle has a zero value, then determining a second theta angle for a node based upon a second equation;
         wherein the second equation determines a second theta angle that is equal to a focus theta angle for a node;
      if a determined relative theta angle has a negative value, then determining a second theta angle for a node based upon a third equation;
         wherein the third equation determines for a node a second theta angle that is equal to:

$$(1+dt)*(\text{maxAng}-\text{FocusTheta})/(dt+1/\text{relTheta})+\text{FocusTheta};$$

wherein the dt for a node in the third equation is indicative of an angular distortion strength factor;
            wherein the FocusTheta for a node in the third equation is indicative of the focus theta angle determined for the node;
            wherein the relTheta for a node in the third equation is indicative of the relative theta angle determined for the node:
            wherein the maxAng and the minAng for a node define angle of the conal layout:
      wherein the three-dimensional conal layout of the nodes is generated using the determined second theta angles for the nodes.

32. A computer-implemented apparatus for displaying nodes on a display device based upon a change in focal position, wherein the nodes have a hierarchical arrangement, apparatus comprising:
   computer instructions configured to receive positional information associated with a plurality of nodes;
   node calculator computer instructions configured to use the positional information to generate a display for the nodes in response to a change in focal position;
   wherein the node calculator computer instructions are configured to perform an angular transformation upon the plurality of nodes' positional information in order to angularly displace each of the plurality of nodes;
   wherein the node calculator computer instructions are configured to perform a conal transformation upon the angularly transformed positional information in order to generate a three-dimensional conal layout of the nodes on the display in response to the change in focal position;
   wherein the generated node layout display maintains the hierarchical arrangement;
   wherein the generated node layout display includes displaying each of the plurality of nodes whose positional information was used in performing the angular transformation;
   wherein the node calculator computer instructions are configured to perform an angular transformation by:
      determining a focus theta angle that defines direction from a focus node to a root node;
      determining nodal offsets with respect to center of the display;
      determining geometric distances from the center;
      for the geometric distances that are not zero, determining theta angles that are equal to a trigonometric transformation of the determined geometric distances;
      comparing the determined theta angles with the determined focus theta angle in order to determine relative theta angles for the nodes;
         wherein the relative theta angles are determined differently based upon whether: a theta angle for a node is less than the focus theta angle, a theta angle for a node is equal to the focus theta angle, or a theta angle for a node is greater than the focus theta angle;

if a determined relative theta angle has a positive value, then determining a second theta angle for a node based upon a first equation;
  wherein the first equation determines a second theta angle for a node that is equal to:

$(1+dt)*(FocusTheta-minAng)/(dt-1/relTheta)+FocusTheta;$ wherein the dt for a node in the first equation is indicative of an angular distortion strength factor;
  wherein the FocusTheta for a node in the first equation is indicative of the focus theta angle determined for the node;
  wherein the relTheta for a node in the first equation is indicative of the relative theta angle determined for the node;
if a determined relative theta angle has a zero value, then determining a second theta angle for a node based upon a second equation;
  wherein the second equation determines a second theta angle that is equal to a focus theta angle for a node;
if a determined relative theta angle has a negative value, then determining a second theta angle for a node based upon a third equation;
  wherein the third equation determines for a node a second theta angle that is equal to:

$(1+dt)*(maxAng-FocusTheta)/(dt+1/relTheta)+FocusTheta;$ wherein the dt for a node in the third equation is indicative of an angular distortion strength factor;
  wherein the FocusTheta for a node in the third equation is indicative of the focus theta angle determined for the node;
  wherein the relTheta for a node in the third equation is indicative of the relative theta angle determined for the node;
  wherein the maxAng and the minAng for a node define angle of the conal layout:
wherein the three-dimensional conal layout of the nodes is generated using the determined second theta angles for the nodes.

33. The method of claim 1, wherein the received positional information associated with the plurality of nodes contains information indicating that the plurality of nodes are in a three-dimensional conal layout.

\* \* \* \* \*

UNITED STATES PATENT AND TRADEMARK OFFICE
CERTIFICATE OF CORRECTION

PATENT NO. : 7,587,409 B2
APPLICATION NO. : 10/949166
DATED : September 8, 2009
INVENTOR(S) : Yakowenko et al.

It is certified that error appears in the above-identified patent and that said Letters Patent is hereby corrected as shown below:

In column 12, line 19, delete "node:" and insert -- node; --.

In column 12, line 54, delete "display;" and insert -- display; --.

In column 13, line 6, delete "(1+dt)*(FocusTheta – minAng) / (dt – 1/relTheta) + FocusTheta;" and insert -- -(1+dt)*(FocusTheta – minAng) / (dt – 1/relTheta) + FocusTheta; --.

Signed and Sealed this

Twenty-third Day of March, 2010

David J. Kappos
*Director of the United States Patent and Trademark Office*